United States Patent [19]
Mähler

[11] Patent Number: 5,963,874
[45] Date of Patent: Oct. 5, 1999

[54] RADIO STATION ARRANGED FOR SPACE-DIVERSITY AND POLARIZATION DIVERSITY RECEPTION

[75] Inventor: Hans Mähler, Onsala, Sweden

[73] Assignee: Telefonaktiebolaget LM Ericsson, Stockholm, Sweden

[21] Appl. No.: 08/721,024

[22] Filed: Sep. 26, 1996

[30] Foreign Application Priority Data

Sep. 29, 1995 [SE] Sweden ............................... 9503394

[51] Int. Cl.[6] .............................. H04B 1/38; H04M 1/00
[52] U.S. Cl. .......................... 455/562; 455/132; 455/272
[58] Field of Search ................................... 455/561, 562, 455/132, 137, 101, 133, 134, 135, 272, 273, 277.1, 277.2

[56] References Cited

U.S. PATENT DOCUMENTS

| 5,203,018 | 4/1993 | Hirose | 455/61 |
| 5,355,520 | 10/1994 | Freeburg et al. | 455/507 |

FOREIGN PATENT DOCUMENTS

| 0 272 510 | 6/1988 | European Pat. Off. | |
| 0 517 196 | 12/1992 | European Pat. Off. | |
| 0149620 | 6/1989 | Japan | 455/272 |
| 0183634 | 7/1990 | Japan | 455/272 |
| 2 257 605 | 1/1993 | United Kingdom. | |
| 0691703A1 | 1/1996 | United Kingdom. | |

OTHER PUBLICATIONS

Author–McMurdo Silver; Title–Scoop! $25 Will Equip Your Superhet for Dual Diversity Reception; Source–Radio News, Dec. 1938; pp. 8,9,48,49.

*Primary Examiner*—Nguyen Vo
*Attorney, Agent, or Firm*—Burns, Doane, Swecker & Mathis, L.L.P.

[57] ABSTRACT

A radio station includes a base station for wireless telecommunication to/from mobile stations. The radio station is expandable with several units, at least one of which includes a receiver, a transmitter, and a device for diversity reception, and each of which includes an antenna that is arranged at a predetermined distance from on or several antennas in the other units. The antennas forming part of each unit are adapted for reception with space diversity in cooperation with at least one antenna in any of the other units. The antennas within each unit can receive signals with different directions of polarization. An optimum input signal is input to the receiver by evaluating the input signals from the antennas in the diversity reception device. The input signals originate from the reception with the antennas which are arranged at different positions in space and also from the reception with different directions of polarization. Each unit includes an attachment arrangement to ensure a predetermined placement relative to other units with respect to distance and direction.

4 Claims, 5 Drawing Sheets

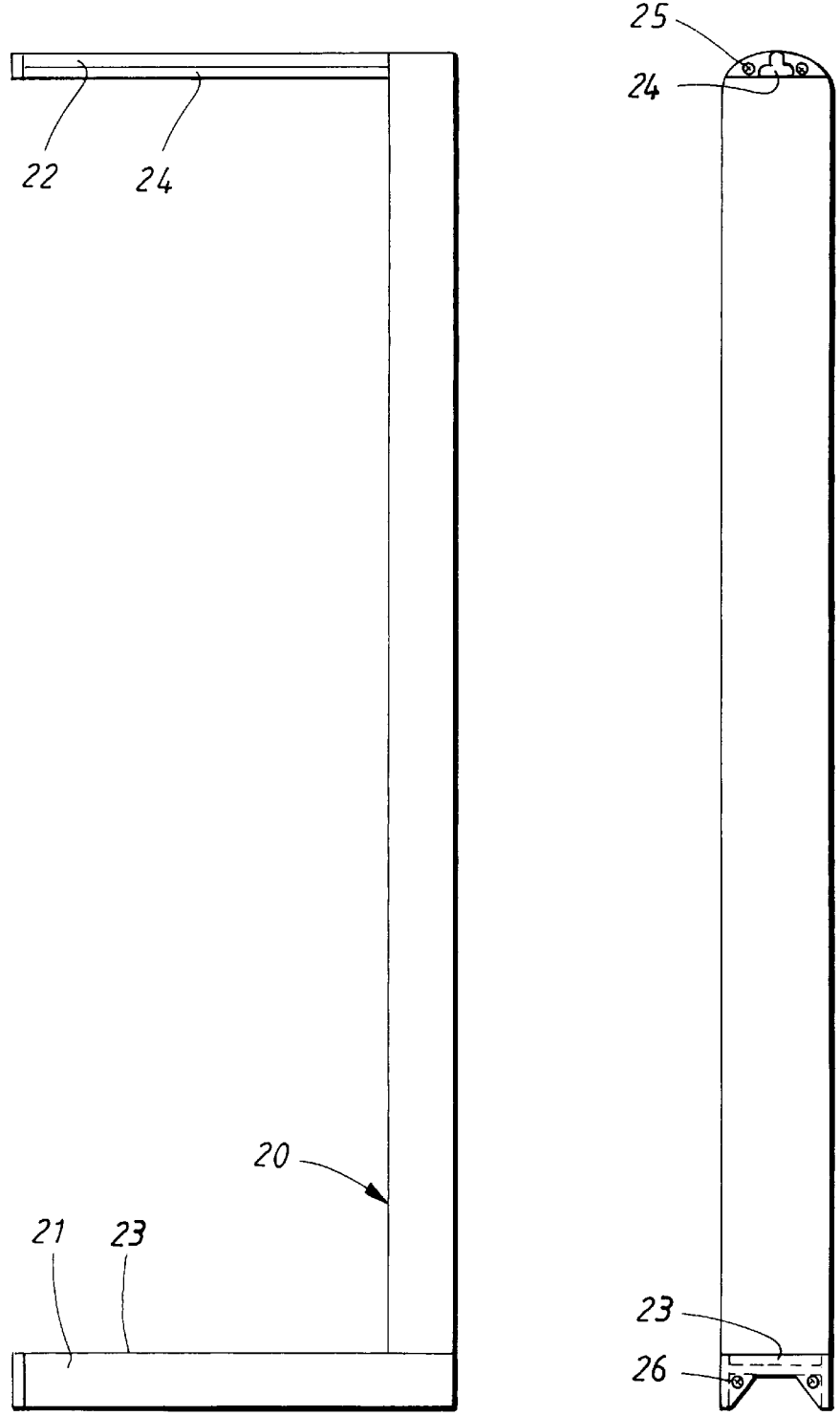

RADIO STATION ARRANGED FOR SPACE-DIVERSITY AND POLARIZATION DIVERSITY RECEPTION

BACKGROUND

The present invention relates to a stationary radio station according to the preamble of appended claim 1.

The present invention relates more particularly to a radio station which constitutes a base-station for a wireless telecommunications system for telecommunication to/from mobile radio units which are within the station's area of coverage.

With wireless telecommunication, the strength of the signal can vary to a large degree between different positions of a receiver antenna. This very local variation is due to fading caused by multi-way propagation, which in turn is due to reflections in the environment.

It is known to solve this problem by so-called diversity reception. Today there are mainly two different types of diversity reception and it is known to use, in one and the same system, either so-called space-diversity or so-called polarisation-diversity. Space-diversity means that two or more receiver antennas are placed at a suitable distance from each other so that the different antennas are not effected by fading, due to multi-way propagation, at the same time; see for example EP 0 517 196 A2. Polarisation-diversity means that radio signals are received both with horizontal and vertical polarisation, either in one and the same antenna with two feeders, one for each polarisation, or with two antennas, whereby due to different polarisation, fading does not occur at the same time in respective feeders or antennas.

The antennas are coupled to a common unit which presents means for selecting the strongest signal at that time, or for combining signals in order to obtain the best possible signal-noise ratio. There are a plurality of well-known algorithms for selecting/combining the signals, e.g. MRC.

The diversity gain i.e. the sensitivity of the receiver, increases with the number of independent channels, for which reason it is desirable to lay out a large number of antennas. A disadvantage with the solutions known up until now is that they require a great deal of space and are very costly. With space-diversity, the antennas namely need to be placed a certain minimum number of wavelengths from each other. Even with polarisation-diversity, an increased space requirement exists. Since the units are often installed in places which are positioned high-up and are thereby difficult to access, the installation cost is a very large part of the total system cost and is in proportion to the number of necessary units.

At the same time as large problems can arise in highly built-up areas due to multi-way propagation, there are economic as well as aesthetic reasons giving rise to a desire to minimize the number of antennas and radio units.

SUMMARY

The object of the present invention is to produce a radio station, with which the inconveniences of multi-way propagation are alleviated, at the same time as the number of antenna units/radio units is limited. Said object is achieved by means of a radio station according to the present invention.

By combining the space-diversity as well as the polarisation-diversity, a noticeable diversity gain can be achieved even with two antennas which can be expanded (built-out) in pairs, in modules, together with additional antenna units/radio units.

BRIEF DESCRIPTION OF THE FIGURES:

The invention will now be described in more detail by means of an embodiment and with reference to the accompanying drawings, in which:

FIG. 4 and FIG. 5 show an example of a stand for mounting of the unit on a foundation (base)

DETAILED DESCRIPTION

Figure 1:
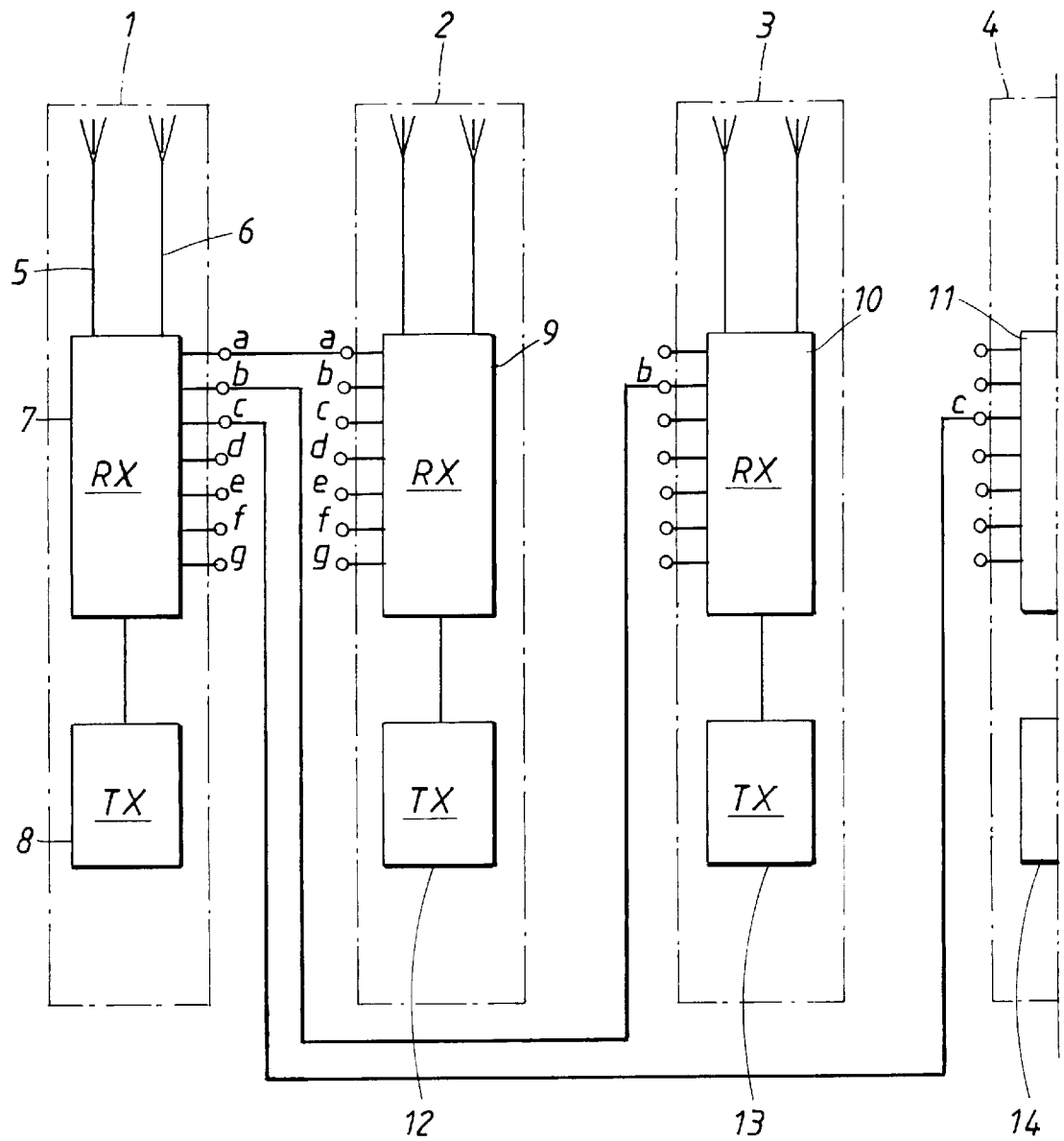
FIG. 1 schematically shows an example of a base-station which is built up of a number of units according to the invention.

FIG. 1 schematically shows the construction of a base-station or cellular station included in a wireless radio communications system for communication to and, respectively, from mobile telecommunications units, so-called mobile telephones. The base-station also communicates with the fixed wire-based telecommunications network and forms the link between a mobile telephone system and the fixed telephone system. The base-station is constructed of a number of units 1–4 which, in the shown example, are four in number but can vary from one up to many units depending on the particular requirements. At the same time as it is desired that the cellular station be as space-saving as possible, there is therefore also a desire to allow an extension of the base-station according to the local requirements. The strength of the incoming radio signal can be very varied from one point in space to another point depending on the local conditions and with resulting multi-way propagation. By building up the units in separate modules, a base-station can be expanded in a modular fashion, whereby the required sensitivity can be achieved by complementing with a desired number of units. Each unit 1–4 consists of at least one antenna, in the shown example two antennas 5, 6, whilst at least one of the units presents a receiver unit 7 and a transmitter unit 8. If each unit is provided with a transmitter unit, a corresponding degree of transmitter power being built up when expanding the sensitivity can be achieved. Included in the receiver unit 7 are means for diversity reception 7a, i.e. for choosing or combining, with a per-se known calculation method, in the form of e.g. software for control of a microprocessor, the input signal from respective antennas 5, 6 for selecting the strongest signal at that time, or for combining both signals so as to obtain the best possible signal-noise ratio. For this purpose, the units 1–4 are physically placed at a mutual distance. By means of this physical mutual distance between the units, so-called space-diversity can be made use of. According to the invention, both of the antennas 5, 6 are also arranged to receive incoming signals with horizontal as well as vertical polarisation. This occurs either due to each antenna 5, 6 being provided with feeders for horizonal as well as vertical polarisation, or the respective antenna being provided with feeders for horizontal polarisation or for vertical polarisation. In this way each one of the units 2, 3, 4 is provided with a single antenna for the polarisation which gives space-diversity with antennas in other units. In this way, space-diversity as well as polarisation-diversity are combined according to the present invention, whereby by maintaining a minimum number of antennas an appreciable sensitivity increase can be achieved. It should thereby be ensured that the units 1–4 are placed at a minimum mutual distance to that unit, with which space-diversity is to be created, which distance can for example be 2 λ, were λ is the wavelength of the emitted signal. The distance is however dependent on a plurality of different factors, such as the surrounding environment and it can therefore vary.

Additionally, each receiver unit 7, 9, 10, 11, is provided with N inputs a–g intended for connection to each one of the corresponding inputs in each additional receiver unit which is to be connected to the first unit for expansion of the base-station. Said means for diversity-reception, which can make use of a per-se known diversity algorithm, are thereby prepared to accept N connections for N additional units 2, 3, 4, which can be connected to the first unit 1. In principal, all of the units can be identical in order to allow a rational modular expansion of a base-station, but the complementing units for example, or certain of them, can be provided with transmitter units, 12, 13, 14 having higher power in order thereby to provide flexibility in the expansion needs, or transmitter units can be left-out for example where only an increase in the reception sensitivity is of interest. Alternatively the expansion units may consist of only antennas, each of which is connected to its own one of the inputs a–g in the ground unit 1.

The units can be combined in different ways, for example all of the expansion units 2, 3, 4, can be connected to the first unit 1, whereby the unit 2 is connected with its input a to the input a of the first unit, the third unit 3 with its input b being connected to the input b of the first unit etc. In each one of the units, antennas with polarisation-diversity are thus included and they create space-diversity with any of the other units.

Figure 2:
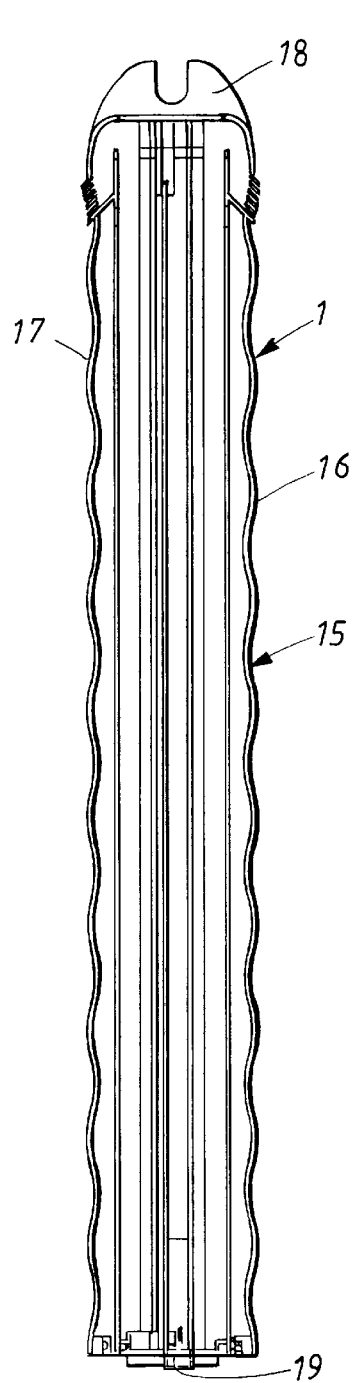
FIG. 2 and FIG. 3 show an example of the mechanical construction of a unit included in the base-station.
Figure 3:
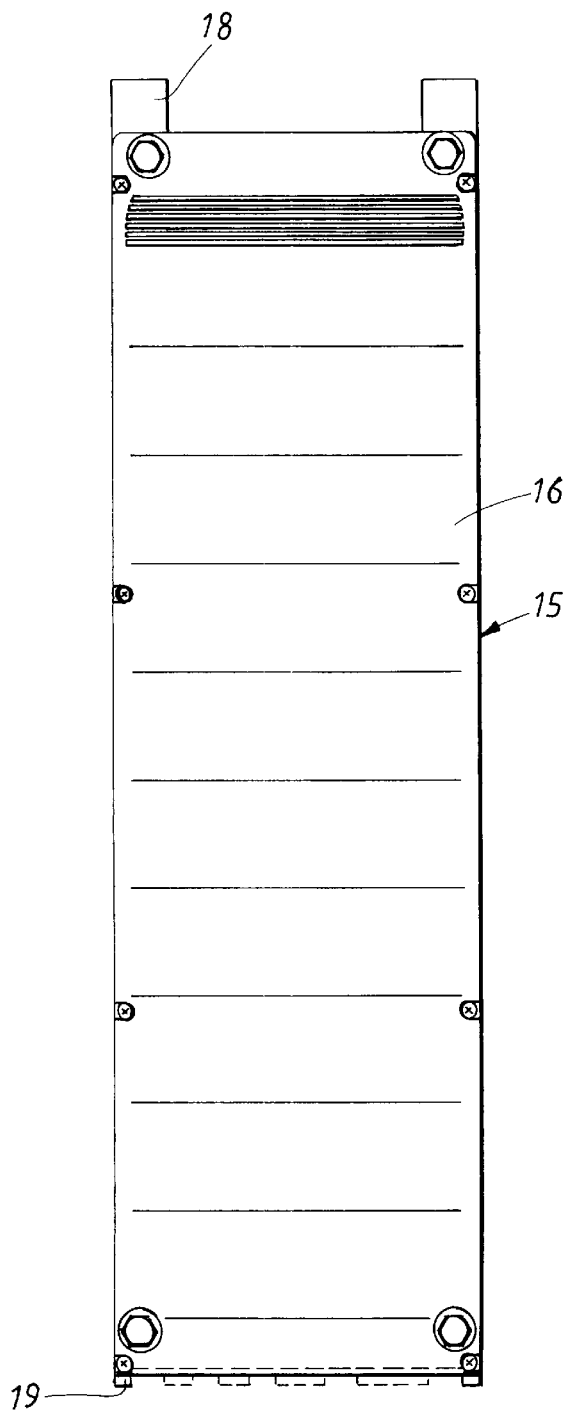

FIG. 2 and FIG. 3 show an example of the mechanical construction of a radio unit 1. Each radio unit 1 is, for example, constructed as a relatively flat, standing body with a casing 15, one side 16 of which and possibly also the opposite side 17 of which are made of a material, e.g. suitably a plastics material, which lets through radio waves of the type concerned. In this way both the antennas 5, 6 in each unit 1 can be placed within the casing which thereby protects the whole unit mechanically and environmentally from external influence. The casing 15 is provided with attachment means 18, 19, which in the shown example are placed at the top and at the bottom respectively, in order to allow a simple and rapid mounting to an attachment bracket 20, which is shown in one example in FIG. 4 and FIG. 5. The attachment bracket 20 in the shown example is formed as a U-shaped yoke with a lower leg and an upper leg 21, 22, with attachment means 23, 24 which are formed for engagement with the attachment means 18, 19 on the unit 1. The upper attachment means on the unit 1 may be formed for example as one or more forks for gripping around a profile on the attachment bracket's upper leg 22. In a corresponding manner, projections 19 at the lower end of the radio unit can engage with a channel which forms the lower attachment means on the attachment bracket 20. The attachment bracket 20 is, in turn, provided with attachment means 25, 26 in the form of e.g. screws passed though holes in the bracket for screwed attachment to a foundation, for example a pillar or wall.

Figure 6:
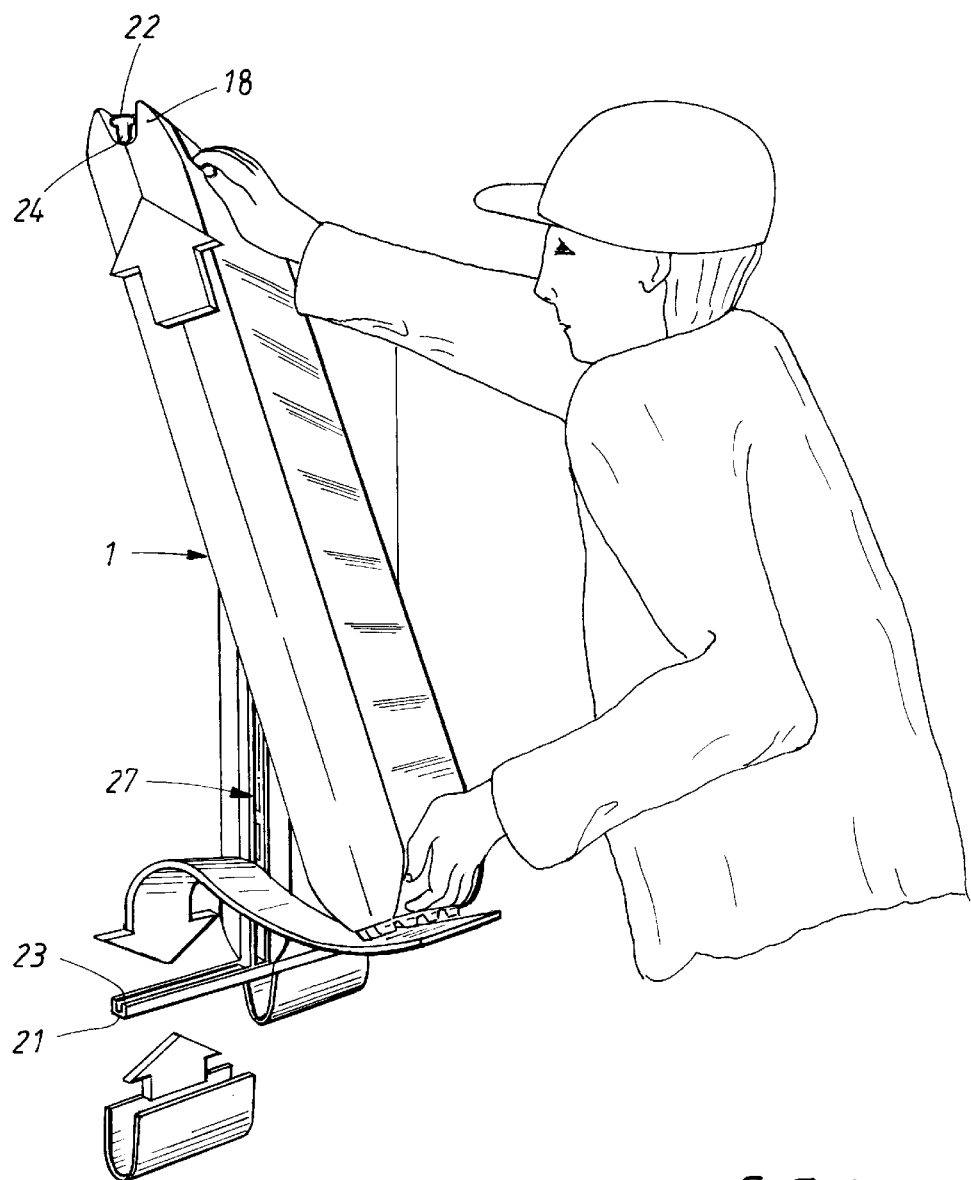
FIG. 6 shows an example of the way of mounting, during mounting of the units, whilst

FIG. 6 shows a modified attachment bracket 27 which is based on the same attachment principal as the bracket according to FIG. 4 and allows mounting entirely without the use of tools, this being visible in the Figure. The unit 1 is simply mounted by means of its upper attachment means 18 being pushed in from below into the upper leg's 22 attachment means 24, upon which the unit is moved down from above with its lower attachment means 19 so that they rest in the channel 23 in the leg 21. The attachment bracket according to FIG. 5 is arranged for attaching at least two units 1, 2, but if the legs are made longer, a larger number can be attached. Alternatively, a plurality of legs can be attached in a row or in another way in a predetermined pattern.

Figure 7:
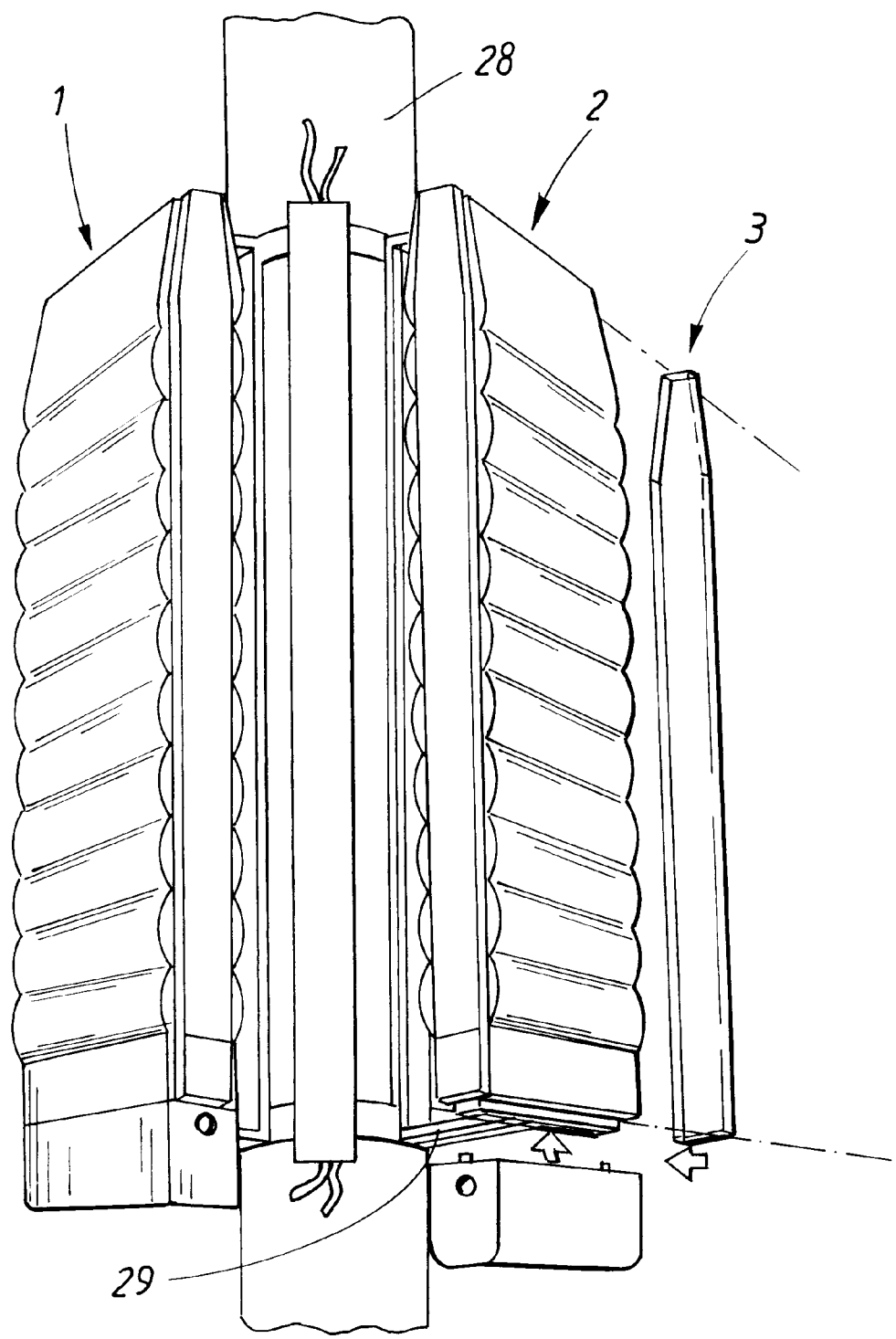
FIG. 7 shows an alternative mounting of the units.

FIG. 7 additionally shows an alternative fixing arrangement for attaching a number of units 1, 2, 3 to a foundation, which in the shown example is constituted by a pillar 28. In this embodiment, the legs 29 of the bracket are T-shaped, whereby the radio units can be kept at a distance from the foundation and can face outwardly from this. The same bracket can also be used for planar foundations, whereby the radio units can be placed in rows.

Common to all the mounting alternatives is that the attachment arrangements for the units allow a predetermined and accurate selection of the position of each unit, both relative to the surroundings as such and also between each other, so that antennas in the units have a suitable chosen position relative to other units. In this way, expansion is facilitated without the need for accurate distance measurement each time expansion occurs and space is saved since each unit is equipped for double diversity reception together with at least one additional unit, i.e. space-diversity as well as polarisation-diversity, whereby aesthetic gains are also achieved. Since fewer units are required for a particular level of sensitivity, house facades and the like do not have to be cluttered up.

The invention is not limited to the embodiments described above and shown in the drawings, but can be varied within the scope of the appended claims. For example, more than two antennas can be used for each unit. Each unit can also comprise more than one receiver unit. Even if it is not necessary, antennas in the different units can advantageously be identical with respect to their antenna diagram, i.e. directionally dependent sensitivity.

What is claimed is:

1. A radio station comprising a base station for wireless telecommunication to/from one or more mobile stations, the radio station comprising:

a number of units, at least one unit comprising a transmitter, a receiver, and means for diversity reception, and each of said units comprising at least one antenna which is arranged to be placed at a predetermined distance from one or more antennas in other units, the antenna(s) included in each unit arranged for reception with space-diversity in cooperation with at least one antenna in any of the other units, the antenna(s) within each unit arranged for reception of signals with different polarization directions for achieving polarization-diversity, and the means for diversity reception evaluating the input signals from the antennas, which input signals originate both from the reception from the antennas with different placement in space and from the reception with different polarization directions, and wherein each unit includes an attachment arrangement which is arranged to ensure a predetermined placement of each unit relative to other units with respect to mutual distance as well as direction.

2. The radio station of claim 1, wherein said means for diversity reception presents a number N of inputs for connection between the unit containing the receiver and the other units.

3. The radio station of claim 1, wherein all of the antennas have mutually equal antenna characteristics.

4. The radio station of claim 1, wherein the attachment arrangement provides a means for mounting the unit to a pre-installed device attached to a foundation.

\* \* \* \* \*